Oct. 24, 1933. P. A. WICKES 1,931,783
ROAD RIPPER
Filed Dec. 14, 1931
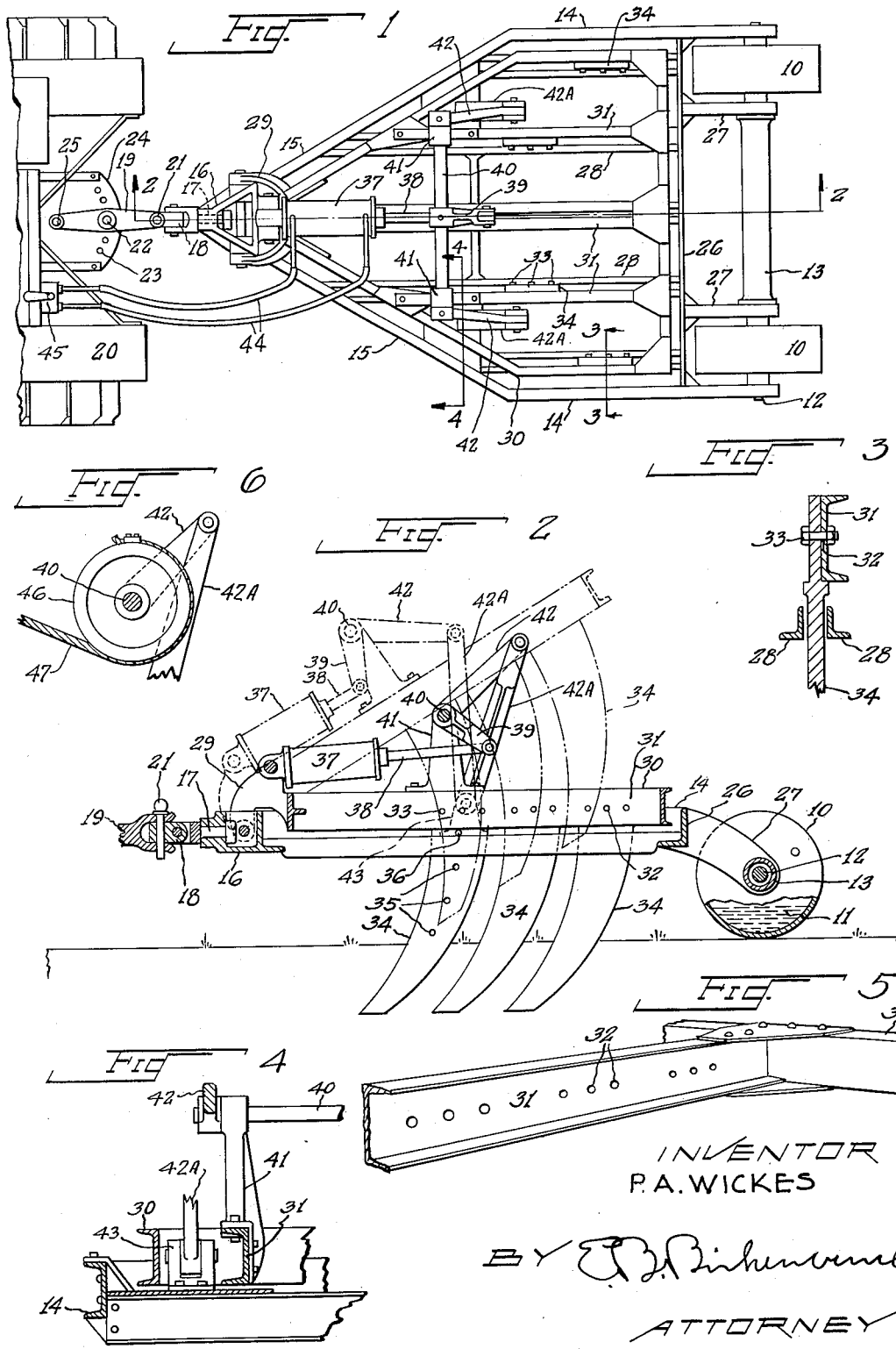
INVENTOR
P. A. WICKES
BY E. B. Birkenbeul
ATTORNEY Patented Oct. 24, 1933

1,931,783

UNITED STATES PATENT OFFICE 1,931,783

ROAD RIPPER

Powers A. Wickes, Portland, Oreg.

Application December 14, 1931
Serial No. 580,905

3 Claims. (Cl. 262—8)

This invention relates generally to scarifying machines and particularly to a road ripper.

The main object of this invention is to provide an improved form of road ripper by means of which compact surfaces may be readily torn up with a minimum amount of labor and with the expenditure of less time than is otherwise required for a like operation.

The second object is to so construct the device that it lends itself to operation either hydraulically or by a cable winding mechanism or other devices not shown and that the teeth will be self-cleaning.

These, and other objects, will become more apparent from the specification following as illustrated in the accompanying drawing, in which:

Fig. 1 is a plan of the device.

Fig. 2 is a vertical section taken along the line 2—2 in Fig. 1.

Fig. 3 is a section taken along the line 3—3 in Fig. 1.

Fig. 4 is a section taken along the line 4—4 in Fig. 1.

Fig. 5 is a fragmentary perspective view showing the various positions for securing the teeth.

Fig. 6 shows an alternative form of operating mechanism employing a cable operating means.

Similar numbers of reference refer to the same or similar parts throughout the several views.

Referring in detail to the drawing, there is shown a pair of spaced ground-engaging wheels 10 preferably made in the form of containers for a liquid 11. The wheels 10 are mounted on an axle 12 which passes through the housing 13. From the ends of the axle 12 extend the frame sides 14 whose forward ends 15 converge toward a head 16 which is joined by a horizontal pin 17 to a swivel coupling 18, which in turn is joined to the draw bar 19 of the tractor 20 by means of the removable pin 21. The horizontal position of the draw bar 19 may be varied by passing the pin 22 through the various holes 23 formed in the plate 24 on which the draw bar 19 is pivotally attached by means of a bolt 25.

Between the frame sides 14 is a cross member 26 from which extends rearwardly the axle-supporting members 27. Between the cross member 26 and the converging ends 15 are the parallel bars 28. These bars are arranged in pairs and serve as strippers for the digging teeth about to be described.

Hinged to the head 16 is a beam head 29 to which is attached a beam frame 30. The frame 30 has the same general shape as does the frame members 14 and 15, but preferably lies within the same as well as within the cross member 26. The beam frame 30 is also provided with paralled beam bars 31 each of which is provided with holes 32 for bolts 33 by means of which the digging teeth 34 are secured to the bars 31. It will be noted in Fig. 5 that the bar 31 is provided with groups of holes 32, the purpose of which is to make it possible to vary the relative positions of the teeth 34. It will also be noted that the teeth 34 pass freely between the parallel stripper bars 28. One or more of the teeth 34 may be provided with holes 35 through which may be placed the stop bolt 36 in order to limit the downward movement of the tooth 34 and consequently the depth of the digging operation. It will be observed that the beam frame 30 is hinged at its forward end and free to rise at its rearward end.

In order that the operator may raise the beam frame with its attached teeth 34, I have provided a hydraulic cylinder 37 one end of which is hinged to the beam head 29. The piston 38 of the cylinder 37 is connected to a lever 39 which is secured to a shaft 40 which journals in the standards 41 on the beam frame 30. On the shaft 40 is secured a pair of arms 42 to which are attached the links 42—A whose lower ends are joined to the brackets 43, secured to the members 15. Fluid in the cylinder 37 is supplied and controlled through the flexible tubing 44 under the control of the valve 45.

The operation of this form of the device is as follows: Assuming that the parts shown in dotted lines in Fig. 2 are in an inoperative position and it is desired to render same operative, the driver of the tractor 20 has only to manipulate the valve 45 in a manner to permit fluid to enter the forward end of the cylinder 37, thereby causing the piston 38 to be moved outwardly and the attached parts to assume the position shown in full lines in Fig. 2. If it is desired to raise the teeth 34 out of the ground or dig to a lesser depth, the valve 45 is operated accordingly causing the piston 38 to be retracted until the teeth 34 are raised the desired amount.

In the form of the device shown in Fig. 6, the hydraulic cylinder is dispensed with, and on the shaft 40 is placed a sheave 46 around which is secured a cable 47 attached to a suitable cable winding mechanism (not shown), preferably located on the tractor 20. While this form of the device has certain advantages over the hydraulically operated type, it is obvious that a cable operates in one direction only and unless an opposing cable is employed, some means must be provided to limit the digging depth. It is for this purpose that I have provided the stop bolts 36 which can be placed in the desired hole 35 on the top side of the stripper bars 31.

The arrangement of the teeth 34 with relation to each other is of course dependent upon the character of the material being loosened as well as the depth of the digging and the power available at the draw bar 19.

It can be seen from the foregoing that there is provided an extremely powerful and easily manipulated road ripper, the teeth of which will be automatically cleared of roots and obstructing objects by the strippers 31 each time they are raised out of the ground.

I claim:

1. In a road ripper, the combination of a wheeled frame having wheels at the rearward end thereof and having the forward end thereof capable of being supported by a tractor, said frame having pairs of spaced stripper bars longitudinally mounted thereon, a beam frame hinged at its forward end to said wheeled frame and occupying a position on the top side of said stripper bars, said beam frame having a plurality of digging teeth attached thereto adapted to pass between the bars of each pair of strippers, and hydraulic means for controlling the elevation of the rearmost end of said beam frame.

2. A road ripper, the combination of a land traveling vehicle having a rigid frame, a beam frame hinged to the forward end of said vehicle on a transverse axis parallel with the axis of the vehicle wheels, digging teeth attached to said beam frame, stripper bars for said teeth disposed on the under side of said frame, and means for varying the inclination of said beam frame.

3. A road ripper, the combination of a wheeled frame with a plurality of pairs of spaced stripper bars longitudinally mounted thereon, a beam frame hinged at its forward end near the forward end of said wheeled frame and occupying a position on the top side of said stripper bars, said beam frame having a plurality of digging teeth attached thereto adapted to pass between the bars of each pair of strippers, and means for controlling the elevation of the rearward end of said beam frame.

POWERS A. WICKES.